United States Patent [19]

Moulds, III et al.

[11] Patent Number: 4,634,946
[45] Date of Patent: Jan. 6, 1987

[54] APPARATUS AND METHOD FOR PREDICTIVE CONTROL OF A DYNAMIC SYSTEM

[75] Inventors: Clinton W. Moulds, III, Millersville; George S. Axelby, North Linthicum, both of Md.

[73] Assignee: Westinghouse Electric Corp., Pittsburgh, Pa.

[21] Appl. No.: 782,860

[22] Filed: Oct. 2, 1985

[51] Int. Cl.⁴ ............................................ G05B 13/00
[52] U.S. Cl. .................................. 318/561; 364/150; 364/178
[58] Field of Search ............... 318/561, 632, 567, 568; 364/148, 149, 150, 151, 152, 578, 581, 571, 178

[56] References Cited

U.S. PATENT DOCUMENTS 3,748,565  7/1973  Wilson ................................ 318/609
4,128,837 12/1978  Page ...................................... 343/76

OTHER PUBLICATIONS

Bruijn, P. M. and L. J. Bootsma and H. B. Verbruggen, "Predictive Control Using Impulse Response Models", Delft Univ. of Tech., 2600GA Delft, The Netherlands, May 28, 1985, pp. 315-320.

Primary Examiner—William M. Shoop, Jr.
Assistant Examiner—Patrick C. Keane
Attorney, Agent, or Firm—W. G. Sutcliff

[57] ABSTRACT

Predictive control of a controlled dynamic system having conventional feedback. The input predictor processes the assumed inputs to the controlled system to determine an error output or value corresponding to the outputs only at the prediction horizon interval. The error output is processed by scalar mathematical operations to adjust the assumed inputs and form actual inputs to the controlled system. This method of predicting the inputs can be accomplished in less time than required by previous systems, and the stability of the controlled system, particularly non-minimum phase systems, is improved.

16 Claims, 7 Drawing Figures

APPARATUS AND METHOD FOR PREDICTIVE CONTROL OF A DYNAMIC SYSTEM

BACKGROUND OF THE INVENTION

This invention relates, in general, to feedback control systems and, more specifically, to predictive control of dynamic systems.

Systems requiring the control of their outputs are varied and numerous. For example, robot position, missile paths, regulator outputs, and elevator travel are all candidates for control systems which specify a desired output position, speed, voltage, etc., and want the system output to match the specified output as closely as possible. In order to achieve these results, many of the systems employ the classical form of feedback from the output to the input of the system being controlled. With such classical feedback, a comparison is made between the desired and actual output of the system and any error is amplified and applied to the input of the system to correct the error. Such types of systems are in widespread use according to the prior art. However, when very precise output control is desired and/or the dynamic characteristics of the system are subject to rapid fluctuation, the degree of reliability and success with conventional classical feedback systems is limited.

In order to make the output of the controlled system more closely match the desired output, a method of predictive control is used in conjunction with classical feedback systems. According to predictive control, a mathematical model of the controlled system which represents the dynamic characteristics of the controlled system, is used to predict the output, in advance, of the controlled system. This is done by applying input values to the model and noting the difference between the output of the model and the desired output of the controlled system. Any difference is considered an error signal and is used to adjust the input to the controlled system so that it will give the proper output. In some predictive control systems, the model of the controlled system may be changed during the operation of the system to compensate for changes in the dynamic characteristics of the system.

Further description of a predictive control system using mathematical models is contained in "Predictive Control Using Impulse Response Models" by P. M. Bruijn, et al., Proceedings of IFAC/IFIP Conference on Digital Computer Applications to Process Control, Dusseldorf, Federal Republic of Germany, October, 1980.

To obtain the inputs which must be applied to a controlled system to give the best output signal, calculations are made based upon what is known about the controlled system for a period of time into the future, known as the "prediction horizon" (PH). Normally, a prediction horizon usually encompasses 3 to 10 discrete time computation or sampling intervals beyond the present time for which the input to the controlled system is being determined.

As a general rule, the more frequently a determination can be made about the value of an input signal to the controlled system, the smoother the input signal will be and the less likely the output signal or output of the controlled system will exhibit any unstable characteristics. For this reason, it is desirable to make the computations concerning the inputs to the controlled system as quickly and efficiently as possible. Such calculations determine the data rate at which predictive control must be implemented. Higher data rates result in less inter-sample ripple on the system output, and allow predictive control to improve trajectory or output following for a wider range of systems. Therefore, it is desirable, and it is an object of this invention, to provide a predictive control system which calculates the future input sequences to the controlled system as rapidly as possible.

The method of calculation of the input sequences also effects the stability of the controlled system. For example, some prior art systems use calculating methods which can cause output instabilities in certain types of controlled systems, such as non-minimum phase systems. Therefore, it is also desirable, and it is another object of this invention, to provide a predictive control system which exhibits stable characteristics with all types of controlled systems, including non-minimum phase systems.

SUMMARY OF THE INVENTION

There is disclosed herein a new and useful predictive system for controlling the output of a dynamic system. The predictive system includes a circuit or subsystem for providing a series of values corresponding to the present and future desired outputs of the controlled system. It is the main object of the predictor to determine the inputs to the controlled system which will yield outputs identical to those desired outputs given by the circuit or subsystem.

In order to provide the correct outputs, the predictive control system first assumes a set of present and future inputs to the controlled system, and these inputs are applied to a mathematical model of the controlled system to determine the output after a period of time, the extent of which time is known as the "prediction horizon" (PH). The calculated output signal is compared to the desired output signal provided by the subsystem, and any error is determined. The error signal is used to adjust the assumed inputs so that the output of the controlled system will be equal to the desired output at the prediction horizon. Once the assumed input signal has been adjusted, the adjusted input signal or values are applied to the controlled system at the present time and a new sampling and calculating interval is initiated.

The calculations which are necessary to determine the presence of an error caused by the assumed input signals involve a sequence of steps which require less mathematical operations than that used according to the prior art systems. Therefore, the predictive system taught by this invention increases the speed of the computation process and allows the input signal to be smoother. In addition, the increased computational speed also makes the predictive control system of this invention more stable with non-minimum phase systems than prior art predictive control systems.

According to the present invention, the calculations determine the output error at a time in the future equal to the prediction horizon by first reading the model weight sequence, the past input sequence, the desired future output, and the present output. From portions of this data, an incremental desired future output is calculated and the input sequence is shifted PH times, while shifting in the most recent input each time. Next, the incremental input sequence is calculated by subtracting the unshifted input sequence from the shifted input sequence. The DOT product of the incremental input sequence and the model weight sequence is formed to provide the computed or calculated future output of the system. A trajectory or output error is then calculated by subtracting the computed future output from the incremental desired future output. The assumed inputs are adjusted with the trajectory or output error by scalar multiplication and division involving the model weights to provide the actual input applied to the system. These simplified scalar operations provide the advantages of the invention over the prior art which requires matrix operations and longer processing time.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Figure 1:
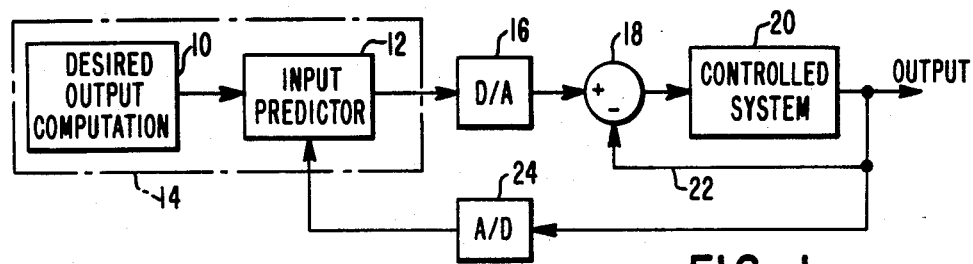
FIG. 1 is a block diagram of a typical predictive control system.

Throughout the following description, similar reference characters refer to similar elements or members in all of the Figures of the drawings.

Referring now to the drawings, and to FIG. 1 in particular, there is shown a typical predictive control system. The control system includes a circuit or subsystem 10 for calculating or providing data corresponding to the desired output of the system. This data is applied to the input predictor 12 which will be described in more detail later. The dashed block 14 indicates that the computation and prediction provided by blocks 10 and 12 can reside in and be performed by a microprocessor system.

The digital outputs from the input predictor 12 are applied to the digital-to-analog converter 16 and the analog signals therefrom are applied to the adder 18. The controlled system 20 can be any of the types of systems which need to follow a desired output signal or path, whether it be a mechanical or electrical output, or any other type of output which can be measured and compared to a desired output. Path 22 provides the conventional feedback of the controlled system and is shown applied to a negative terminal of the adder 18. This type of feedback is advantageous and desirable in many types of applications. Its success, however, is highly dependent upon the bandwidth and gain of the controlled system, with the amplification and bandwidth being limited by the availability of suitable components and the need to prevent instability in the system output.

The output of the controlled system is also applied to the analog-to-digital converter 24 which has its digital output applied to the input predictor 12. The purpose of this portion of the circuit is to provide a means for resetting the input predictor 12 and allowing for resetting or recalculating the model weights in the input predictor 12, depending upon the position of the output of the controlled system 20. Calculations by the input predictor 12 are made at regular intervals throughout the control time, with said intervals being dependent to a large extent upon the time required to determine the magnitude of the next input to the controlled system. For example, if the desired output computation signal provided by block 10 indicates the desired outputs at intervals of 10 milliseconds, it would be necessary for the input predictor 12 to make the necessary calculations in a time period shorter than 10 milliseconds so that the next signal applied to the controlled system 20 would be synchronized with the desired output from the computation subsystem 10.

Figure 2:
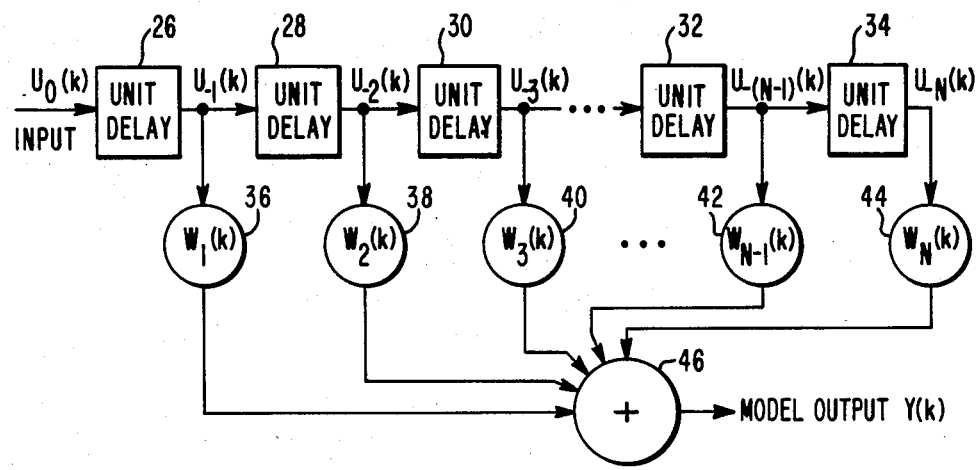
FIG. 2 is a block diagram of an impulse response model used by the predictive control system of FIG. 1.

FIG. 2 is a block diagram of an input-to-output impulse response model used by a typical input predictor of a predictive control system. The impulse response model is a mathematical model representing the dynamic characteristics of the overall controlled system. The model yields or provides an output which is dependent upon the values of the signals applied to the system over a period of time. An understanding of the impulse response model is desirable for a thorough understanding of the present invention.

As shown in FIG. 2, the impulse response model includes the unit delays 26, 28, 30, 32 and 34. The output of each delay is conditioned or weighted by the model weights 36, 38, 40, 42 and 44. Although the impulse response model shown in FIG. 2 contains provisions for only five input impulses, it is emphasized that additional delay and weight elements may be added to the response model without departing from the scope of the invention.

The individual weighted and delayed inputs are summed by the adder 46 to provide the model output Y(k). Represented mathematically, the weighted sum of the individual delay element outputs is:

$$Y(k) = \sum_{i=1}^{N} W_i(k) * U_{-i}(k) \tag{1}$$

where * indicates multiplication. The delay elements are connected to form a shift register or tapped delay line fed by the input $U_o(k)$ where:

$$U_{-i}(k) = U_{-(i+1)}(k+1) \tag{2}$$

The weights $W_i(k)$ represent the successive values of the model's pulse response. The time index k indicates that the model weights can change during system operation.

Figure 3:
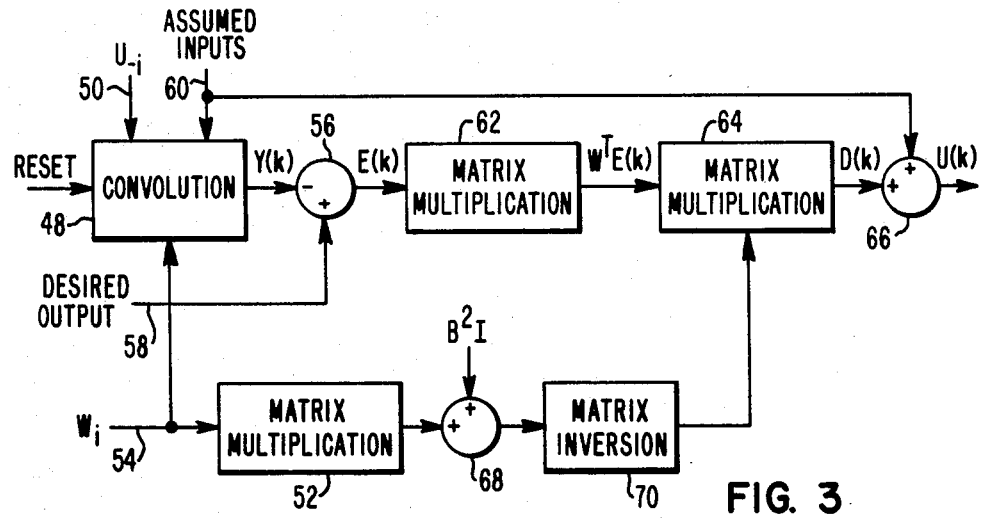
FIG. 3 is a diagram illustrating the steps used in calculating the predictive system inputs according to a prior art arrangement.

FIG. 3 is a diagram illustrating steps used in calculating the predictive control system inputs according to a prior art arrangement. According to FIG. 3, the N most recent past inputs, $U_{-N}$ to $U_{-1}$, are applied to the convolution block 48 as shown by the arrow 50. The latest version of the model weights, $W^1$ to $W_N$, are applied to the convolution block 48 and to the matrix multiplication stage 52, as shown by arrow 54. A number of desired values of the future system output, with the number being equivalent to the prediction horizon, are applied to the adder 56, as indicated by arrow 58. The prediction horizon (PH) is the number of sample times that the input predictor looks into the future. PH future values of the input sequence, $U_o$ to $U_{PH-1}$, are assumed by the predictor, as indicated by arrow 60. For example, $U_o$ to $U_{PH-1}$ can all be assumed equal to $U_{-1}$, the most recent actual input. Therefore, the sequence of past and assumed future inputs, $U_{-N}$ to $U_{PH-1}$, is convolved with the sequence of model weights, $W_1$ to $W_N$, according to equations (1) and (2) to produce computed values of the system output Y(k), based upon the assumed input values, PH sample times into the future.

In general, the desired future output or trajectory, Y(k), will be different than the computed future output based upon the assumed future inputs. An output error sequence, E(k), is generated by the equation:

$$E(k) = \text{desired } Y(k) - \text{computed } Y(k) \qquad (3)$$

as k varies from the present time index of the present index plus PH.

Input prediction consists of finding a future input correction sequence, D(k), by which to adjust the assumed sequence, U(k), so that the adjusted trajectory or output error sequence, E(k), will be minimized. A matrix is used to minimize the error sequence, with a matrix represented by $(W^T W + \beta^2 I)^{-1} * W^T$, where $W^T$ denotes the matrix transpose of W, $(\ )^{-1}$ denotes the matrix inverse, and $\beta^2 I$ has been used (where I is the identity matrix) to add a small positive number along the diagonal of $W^T W$ to avoid possible ill-conditioning and to improve invertibility. It also reduces large input variations as the value of $\beta^2$ increases. This matrix can be formed using only the model weights and the predetermined constant $\beta^2$.

After E(k) has been formed by using equation (3) and D(k) has been formed, the final result of the input predictor, the predicted future input sequence, U(k), can be obtained by using the equation:

$$\text{predicted } U(k) = D(k) + \text{assumed } U(k) \qquad (4)$$

Blocks 62, 64, 66, 68 and 70 of FIG. 3 indicate the mathematical operations performed by the equations. The present value of the predicted U(k), which is the first term in the sequence, is actually applied as an input to the controlled system to achieve predictive control. One sample time later, the input prediction cycle is started again.

Figure 4:
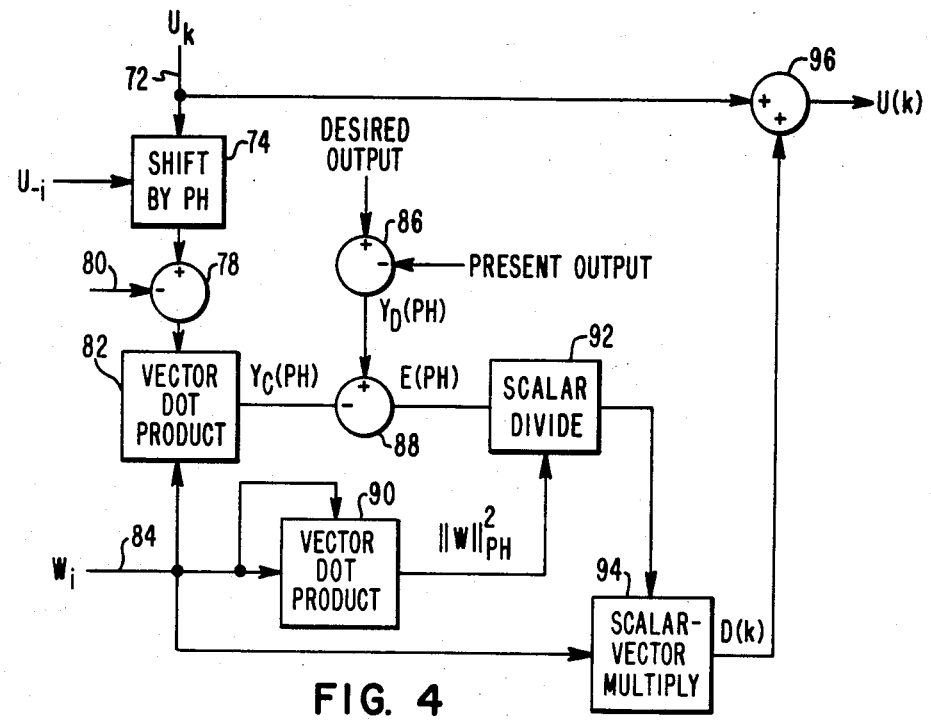
FIG. 4 is a diagram illustrating the steps used in calculating the predictive system inputs according to this invention.

FIG. 4 illustrates the operation of the predictive controller of this invention. As shown in FIG. 4, the input predictor chooses the predicted future input sequence, U(k), over the prediction horizon, PH (o≦k≦PH), so as to match the desired output trajectory, the desired $Y_D(PH)$, at time PH in the future, to the predicted output or trajectory, the predicted $Y_p(PH)$, based on the impulse response model shown in FIG. 2 also at time PH in the future. The predicted and desired outputs are being matched only at time PH in the future, and not at times zero (the present) through PH.

PH future inputs $U_{(o)}$ to $U_{(PH-1)}$ are assumed, as shown by arrow 72 in FIG. 4. As shown by block 74, these are not convolved according to the prior art, but are shifted PH times to represent looking PH sample times into the future. The past inputs, $U_{-i}$, represented by arrow 76, are also shifted. This provides a shifted sequence which is applied to the adder 78 along with an unshifted sequence, represented by arrow 80. The incremental sequence is applied to block 82 which is multiplied with the model weights, as represented by arrow 84, to yield the vector DOT product which represents the computed incremental system output, or the computed $Y_c(PH)$ at a single time in the future. Adders 86 and 88 combine the desired output, the present measured output, and the computed system output to form the output error at time PH. Incremental outputs, $Y_c(PH)$ and $Y_o(PH)$, are used to compute the output error E(PH) to prevent undesired bias errors which could accumulate if actual outputs were used directly as they are in some forms of the prior art. Thus, $$E(PH) = \text{desired } Y_D(PH) - \text{computed } Y_c(PH). \qquad (5)$$

The trajectory or output error can then be used to adjust the sequence of future inputs from equation (1), $$Y(PH) = \sum_{i=1}^{N} W_i U(PH - i) = \sum_{i=1}^{PH} W_i U(PH - i) + \qquad (6)$$

$$\sum_{i=PH+1}^{N} W_i U(PH - i)$$

where $[W_i]$ are the weights of the impulse response model, and U( ) are the inputs, with positive indices denoting the future. The second term on the right side of equation (6) contains past inputs which have already been applied, while the first term uses inputs that are to be applied in the future. Using the assumed future input sequence, the computed system output can be expressed as:

$$Y_c(PH) = \sum_{i=1}^{PH} W_i * \text{assumed } U(PH - i) + \qquad (7)$$

$$\sum_{i=PH+1}^{N} W_i * U(PH - i)$$

The input predictor must find a predicted U(k) sequence which, when applied to the model, will produce a predicted output, $Y_p(PH)$, which should agree closely with the desired future output or trajectory:

$$Y_D(PH) \sim Y_p(PH) = \sum_{i=1}^{PH} W_i * \text{predicted } U(PH - i) + \qquad (8)$$

$$\sum_{i=PH+1}^{N} W_i * U(PH - i)$$

If the unknown inputs (predicted U(o) to predicted U(PH−1)) are chosen to satisfy equation (8), all other quantities in that equation being known, then the error (desired $Y_D(PH)$ − predicted $Y_p(PH)$) will be forced to zero. Since equation (8) is one linear equation in PH unknowns, the solution is non-unique, and it is possible to choose a solution procedure that produces unstable predictive control; i.e., an input sequence that grows without bound. A method of solution that avoids instability and produces satisfactory predictive control is to modify the assumed U(k) sequence as follows:

$$\text{predicted } U(PH - i) = \text{assumed } U(PH - i) + \frac{E(PH) * W_i}{\|W\|_{PH}^2} \qquad (9)$$

for $1 \leq i \leq PH$, where the symbol $\|W\|_{PH}^2$ means $$\sum_{i=1}^{PH} W_i^2,$$

and E(PH) is defined in equation (5). This expression for the predicted U(k) sequence solves equation (8) and makes predicted Y(PH) equal to desired Y(PH).

As shown in FIG. 4, the vector DOT product 90 provides $\|W\|_{PH}^2$ which is divided into the error signal by the scalar divide block 92. This result is multiplied by the model weights, as illustrated by block 94. Blocks 90, 92 and 94 provide the processing necessary to implement the right-hand term of equation (9). The future input correction sequence, D(k), is applied to the adder 96 along with the assumed inputs to yield the actual predicted future inputs to the controlled system. The first term of the sequence is actually applied to the input of the controlled system and, as in the prior art, the whole process is started again one sample time later.

The computation time of both the prior art predictor and the predictor of this invention can be expressed, for purposes of comparison, in terms of the number of operations required per sample time, where an operation is defined as a multiply and an add. The total number of operations for the prior art system shown in FIG. 3 can be listed as follows:

(a) The convolution that produces the assumed future Y(k) sequence requires N operations for each term of the sequence and there are PH terms (N is the number of weights in the model, and PH is the prediction horizon), for a subtotal of (N)*(PH) operations.

(b) The matrix multiply that products $W^T*E$, since E is a PH-long vector and $W^T$ is an upper-triangular PH-by-PH matrix, requires $(PH^2+PH)/2$ operations.

(c) The matrix multiply that produces $W^T*W$, since W is a lower-triangular PH-by-PH matrix, requires $[PH^3+3*PH^2+2*PH]/6$ operations.

(d) The matrix inversion that produces $[W^TW+\beta^2 I]^{-1}$ requires $PH^3$ operations if the inversion is done by Gaussian elimination.

(e) The matrix multiply that produces $D=[W^TW+\beta^2 I]^{-1}*W^T*E$, since $W^T*E$ is a PH-long vector and $[W^TW+\beta^2 I]^{-1}$ is a PH-by-PH matrix, requires $PH^2$ operations.

The total number of operations per sample time for the prior art input predictor is thus $(7/6)*PH^3+2*PH^2+(N+5/6)*PH$.

For the input predictor of the present invention, the total number of operations can be listed as follows:

(a) The vector DOT product that produces assumed Y(PH) requires N operations.

(b) The vector DOT product that yields $\|W\|_{PH}^2$ requires PH operations.

(c) The scalar divide that produces $E(PH)/\|W\|_{PH}^2$ requires one operation.

(d) The scalar-vector multiply that produces the [D(k)] sequence requires PH operations.

The total number of operations per sample time for the input predictor of this invention is thus $2*PH+N+1$.

In both the prior art and the input predictor of this invention, the number of operations required is linear in N (model length), but the new predictive controller is linear in PH (prediction horizon) while the prior art controller's computation time increases as the cube of PH. Table I illustrates a comparison of the number of operations for the two systems.

TABLE I

| | | NUMBER OF OPERATIONS | | |
|---|---|---|---|---|
| N | PH | Prior Matrix System | New Scalar System | Operation Reduction Factor (ORF) |
| 1 | 1 | 5 | 4 | 1.3 |
| 5 | 1 | 9 | 8 | 1.1 |
| 10 | 1 | 14 | 13 | 1.1 |
| 20 | 2 | 59 | 25 | 2.4 |
| 20 | 3 | 112 | 27 | 4.1 |
| 30 | 2 | 79 | 35 | 2.3 |
| 30 | 3 | 142 | 37 | 3.8 |
| 30 | 4 | 230 | 39 | 5.9 |
| 40 | 2 | 99 | 45 | 2.2 |
| 40 | 3 | 172 | 47 | 3.7 |
| 40 | 4 | 270 | 49 | 5.5 |
| 40 | 5 | 400 | 51 | 7.8 |
| 10 | 4 | 150 | 19 | 7.9 |
| 10 | 8 | 812 | 27 | 30.1 |

Figure 5:
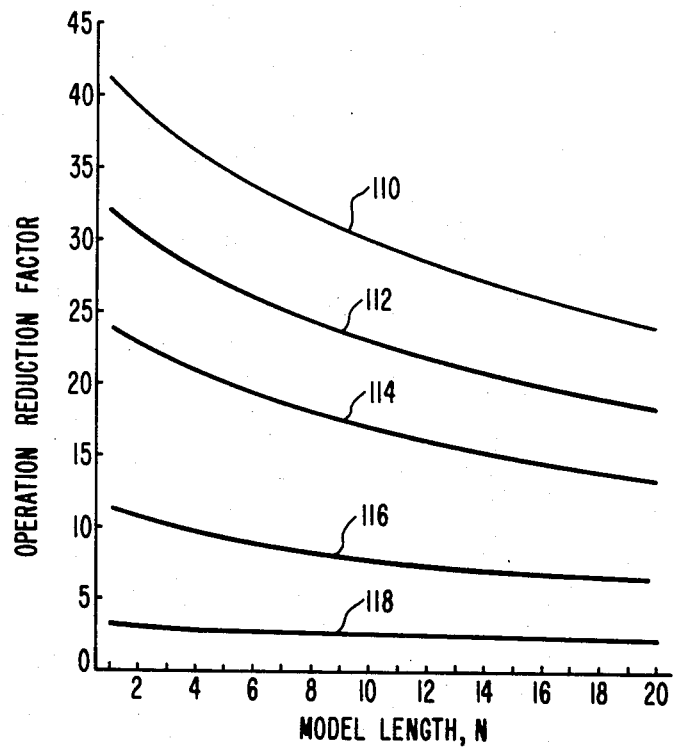
FIG. 5 is a graph illustrating the reduction in computational operations afforded by the present invention.

FIG. 5 is a graph illustrating the relationship between the operation reduction factor (ORF), the number of prediction horizons, and the model lengths or the number of weights in the model. Curve 110 corresponds to a prediction horizon of 8, curve 112 to a PH of 7, curve 114 to a PH of 6, curve 116 to a PH of 4, and curve 118 to a PH of 2. As can be seen from Table I and the graph of FIG. 5, the new controller of this invention requires fewer operations in all cases. For prediction horizons of two or greater, which are needed in practice to avoid non-minimum phase and time delay difficulties, the savings are quite dramatic, with the new controller reducing the number of operations by ORF's ranging from 30.1 to 2.2 for system models having a number of weights, N, equal to or greater than 10.

Figure 6:
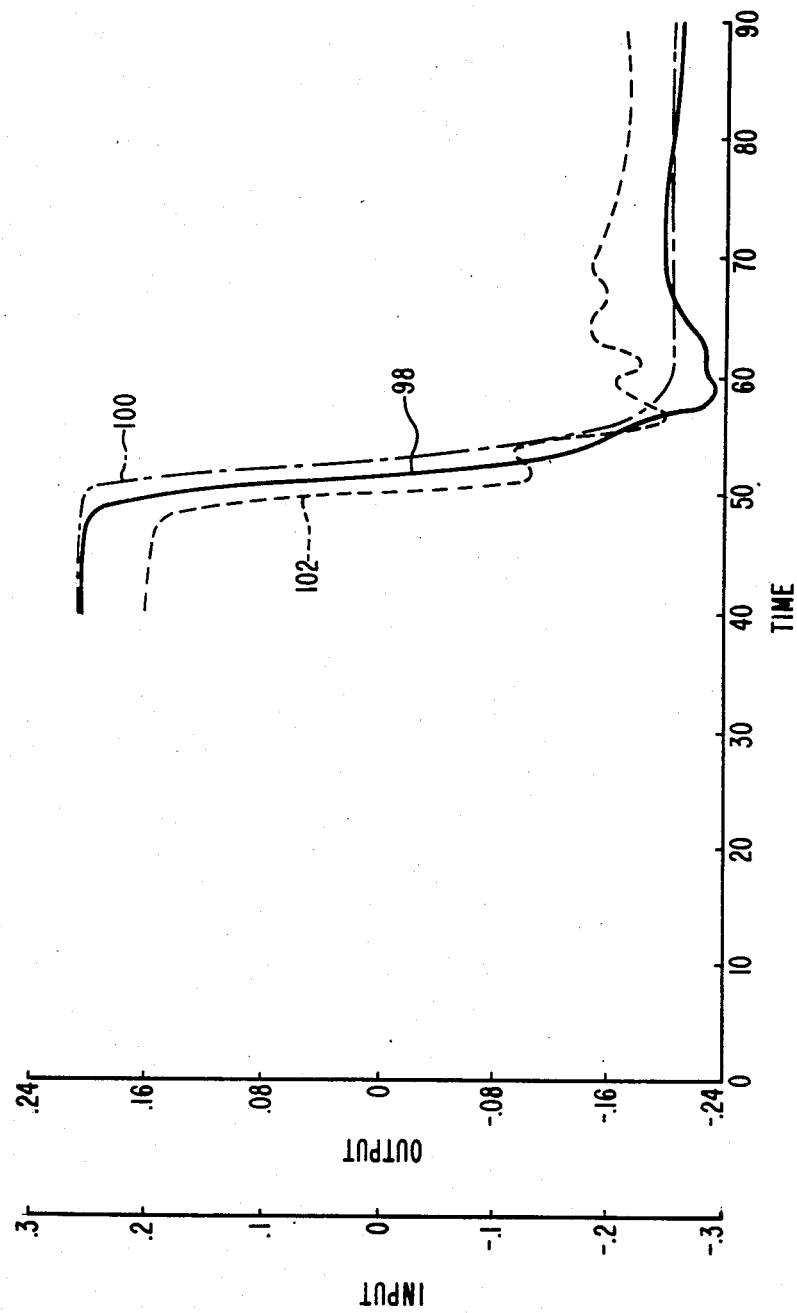
FIG. 6 is a graph illustrating the performance of a predictive system constructed according to the prior art.

Experimental data has shown that the input predictor of this invention performs better than the input predictor of the prior art. FIG. 6 is a graph indicating the experimental performance of a prior art input predictor constructed according to FIG. 3. As shown in FIG. 6, curve 98 represents the actual output of the controlled system. Curve 100 denotes the desired output of the controlled system and curve 102 illustrates the input to the controlled system from the input predictor which was provided by the prior art system. As can be seen from the curves of the graph in FIG. 6, the input to the controlled system from the input predictor, curve 102, is rather abrupt and changes frequently and quickly during the active period of the controlled sequence. In addition, as shown by curve 98, the actual output has considerable overshoot beyond the desired output trajectory, as indicated by curve 100.

Figure 7:
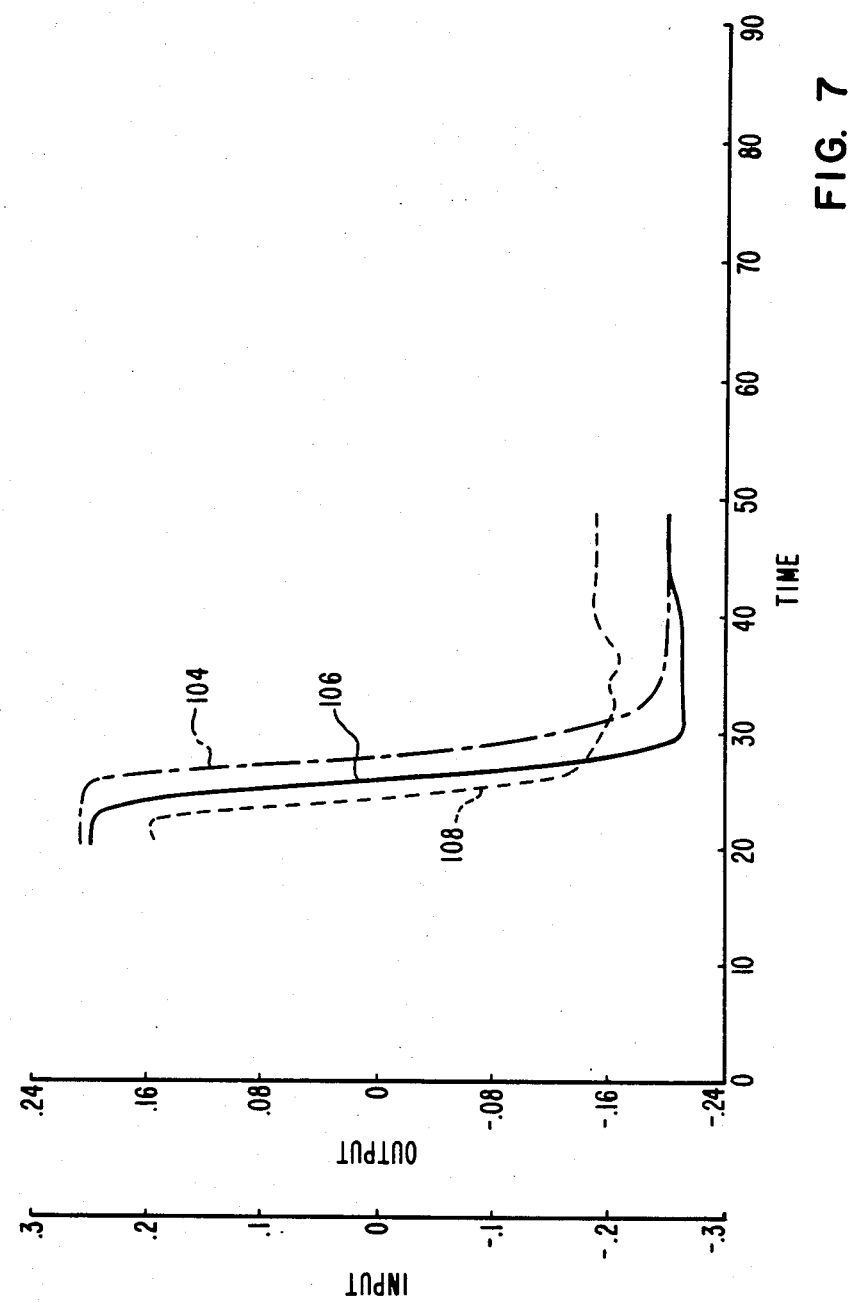
FIG. 7 is a graph illustrating the performance of a predictive system constructed according to this invention.

Experimental results for a controlled system constructed according to this invention with similar dynamic characteristics and a similar desired output are shown in FIG. 7. Curve 104 represents the desired output, curve 106 represents the actual output, and curve 108 represents the input from the input predictor which is applied to the controlled system. As can be seen from the curves of FIG. 7, the input is much smoother than the input which needed to be applied to the controlled system by the prior art input predictor. In addition, the actual output of the controlled system, as shown in FIG. 7, has less overshoot than that shown in FIG. 6. Therefore, it exhibits more stable characteristics than the input predictor of the prior art.

An improved input predictor for a predictive controller has been disclosed which requires significantly fewer operations than prior art input predictors. These improvements allow predictive control either with less hardware or at higher sampling rates than was previously possible, or a combination of both benefits. In addition, greater system stability and much more smoothing can be obtained using the improved predictor of this invention than can be provided with input predictors constructed according to the prior art. Also, the improved predictive controller of this invention can be used more readily with non-minimum phase and time-delay systems which are often found in discrete-time, computer-controlled (that is, sampled data) systems.

Since different embodiments of the invention may be made without departing from the scope of the invention, it is intended that all of the matter contained in the foregoing description, or shown in the accompanying drawings, shall be interpreted as illustrative rather than limiting.

We claim as our invention:

1. A predictive method for controlling the output of a sample dynamic system, said method including the steps of:

providing a plurality of future output values defining the desired future output of the controlled system for each sample period up to a predetermined prediction horizon of future sample periods;

acquiring data values corresponding to past values of inputs to the controlled system;

using model weight values and said past values of inputs to determine assumed future inputs for predicting the output of the controlled system only at a time corresponding to the prediction horizon;

comparing the predicted output with the corresponding desired output to provide an error value;

compensating said error value with the model weights to provide a correction value;

adjusting the assumed future inputs by said correction value to provide a corrected input; and applying the corrected input to the controlled system.

2. The predictive control method of claim 1 wherein the predicted output and the desired output are compared only for the sample at the prediction horizon.

3. The predictive control method of claim 1 wherein the compensation of the error value is performed with only scalar number quantities.

4. The predictive control method of claim 3 including the steps of:

multiplying the error value with the model weights to provide a first quantity; and dividing said first quantity by the sum of the squares of the model weights up to the prediction horizon.

5. The predictive control method of claim 4 wherein the squares of the model weights are derived from the DOT product of the model weights.

6. The predictive control method of claim 1 including the step of shifting the past and assumed future inputs by an amount of time equal to the prediction horizon.

7. The predictive control method of claim 1 including the step of forming a vector DOT product from two inputs of the model weights.

8. A predictive method for controlling the output of a sampled dynamic system, said method including the steps of:

providing a plurality of future output values defining the desired future outputs of the controlled system for each sample period up to a predetermined prediction horizon of future sample periods;

acquiring data values corresponding to past values of inputs to the controlled system;

using model weight values and said past values of inputs to determine assumed future inputs for predicting the output of the controlled system only at a time corresponding to the prediction horizon;

shifting the past and assumed future inputs by an amount of time equal to the prediction horizon;

comparing the predicted output with the corresponding desired output only at the prediction horizon to provide an error value;

multiplying the error value with the model weights to provide a first quantity;

forming a vector DOT product from two inputs of the model weights;

dividing said first quantity by said vector DOT product to obtain a correction value;

adjusting the assumed inputs by said correction value to provide a corrected input; and applying the corrected input to the controlled system.

9. Predictive apparatus for controlling the output of a sampled dynamic system, said apparatus comprising:

means for providing a plurality of future output values defining the desired future output of the controlled system for each sample period up to a predetermined prediction horizon of future sample periods;

means for acquiring data values corresponding to past values of inputs to the controlled system;

means for using model weight values and said past values of inputs to determine assumed future inputs for predicting the output of the controlled system only at a time corresponding to the prediction horizon;

means for comparing the predicted output with the corresponding desired output to provide an error value;

means for compensating said error value with the model weights to provide a correction value;

means for adjusting the assumed future inputs by said correction value to provide a corrected input; and means for applying the corrected input to the controlled system.

10. The predictive control apparatus of claim 9 wherein the predicted output and the desired output are compared only for the sample at the prediction horizon.

11. The predictive control apparatus of claim 9 wherein the compensation of the error value is performed with only scalar number quantities.

12. The predictive control apparatus of claim 11 including:

means for multiplying the error value with the model weights to provide a first quantity; and means for dividing said first quantity by the sum of the squares of the model weights up to the prediction horizon.

13. The predictive control apparatus of claim 12 wherein the squares of the model weights are derived from the DOT product of the model weights.

14. The predictive control apparatus of claim 9 including means for shifting the past and assumed future inputs by an amount of time equal to the prediction horizon.

15. The predictive control apparatus of claim 9 including means for forming a vector DOT product from two inputs of the model weights.

16. Predictive apparatus for controlling the output of a sampled dynamic system, said apparatus comprising:

means for providing a plurality of future output values defining the desired future outputs of the controlled system for each sample period up to a predetermined prediction horizon of future sample periods;

means for acquiring data values corresponding to past values of inputs to the controlled system;

means for using model weight values and said past values of inputs to determine assumed future inputs for predicting the output of the controlled system only at a time corresponding to the prediction horizon;

means for shifting the past and assumed future inputs by an amount of time equal to the prediction horizon;

means for comparing the predicted output with the corresponding desired output only at the prediction horizon to provide an error value;

means for multiplying the error value with the model weights to provide a first quantity;

means for forming a vector DOT product from two inputs of the model weights;

means for dividing said first quantity by said vector DOT product to obtain a correction value;

means for adjusting the assumed inputs by said correction value to provide a corrected input; and means for applying the corrected input to the controlled system.

* * * * *